US010024970B2

United States Patent
Hoffman, Jr. et al.

(10) Patent No.: US 10,024,970 B2
(45) Date of Patent: Jul. 17, 2018

(54) SENSOR HOUSING ASSEMBLY FOR ATTACHMENT TO A MOTOR VEHICLE

(71) Applicant: Dura Operating, LLC, Auburn Hills, MI (US)

(72) Inventors: Robert John Hoffman, Jr., Royal Oak, MI (US); Cumhur Unveren, Commerce Township, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 15/242,157

(22) Filed: Aug. 19, 2016

(65) Prior Publication Data

US 2018/0052236 A1 Feb. 22, 2018

(51) Int. Cl.
*B60R 11/00* (2006.01)
*B60R 13/04* (2006.01)
*B62D 25/02* (2006.01)
*G01S 17/93* (2006.01)
*G01S 7/481* (2006.01)

(52) U.S. Cl.
CPC ............ *G01S 17/936* (2013.01); *B60R 11/00* (2013.01); *B60R 13/04* (2013.01); *G01S 7/4813* (2013.01); *B60R 2011/004* (2013.01)

(58) Field of Classification Search
CPC ... B60R 2011/004; B60R 11/00; B60R 13/04; G01S 17/93; G01S 17/936; G01S 2013/9371; G01S 2013/9375; G01S 2013/9378; G01S 2013/9385; G01S 2013/9389; G01S 2015/937; G01S 2015/938; B62D 25/025; B60W 2420/52
See application file for complete search history.

(56) References Cited

U.S. PATENT DOCUMENTS

| | | | | |
|---|---|---|---|---|
| 4,278,962 A | * | 7/1981 | Lin | ......................... E04H 6/426 312/237 |
| 5,483,501 A | * | 1/1996 | Park | ...................... B06B 1/0688 310/317 |
| 5,495,137 A | * | 2/1996 | Park | ...................... B06B 1/0688 310/331 |
| 6,335,789 B1 | * | 1/2002 | Kikuchi | ................ G01S 7/4817 180/169 |
| 7,969,558 B2 | | 6/2011 | Hall | |

(Continued)

FOREIGN PATENT DOCUMENTS

DE 102011103349 A1 11/2012

*Primary Examiner* — Gregory A Blankenship
(74) *Attorney, Agent, or Firm* — Robert E. Ford; Raymond J. Vivacqua; Steven L. Crane (57) ABSTRACT

A sensor housing assembly for attachment to a vehicle includes a base portion having a first end, a second end, and an exterior decorative surface. The sensor housing assembly further includes a sensor housing portion adapted to house a Light Detection and Ranging (LiDAR) sensor and having a generally semi-cylindrical shape with a top portion and a bottom portion. The top portion forms a first end of the semi-cylindrical sensor housing portion and the bottom portion forms a second end of the semi-cylindrical sensor housing portion. The sensor housing portion is disposed between the first end and the second end of the base portion and extends outward from the exterior surface of the base portion. The sensor housing portion has a window disposed between the top portion and the bottom portion.

20 Claims, 4 Drawing Sheets

(56) References Cited

U.S. PATENT DOCUMENTS

| | | | |
|---|---|---|---|
| 8,675,181 B2 | 3/2014 | Hall | |
| 8,767,190 B2 | 7/2014 | Hall | |
| 9,194,168 B1 | 11/2015 | Lu et al. | |
| 2002/0057195 A1* | 5/2002 | Yamamura | B60K 31/0008 340/435 |
| 2007/0188734 A1* | 8/2007 | Waquet | G01S 17/93 356/4.01 |
| 2010/0020306 A1 | 1/2010 | Hall | |
| 2011/0216304 A1 | 9/2011 | Hall | |
| 2012/0086238 A1* | 4/2012 | Tan | B62D 25/025 296/209 |
| 2014/0320845 A1* | 10/2014 | Bayha | G01S 17/026 356/5.03 |
| 2014/0354997 A1* | 12/2014 | Bayha | G01S 7/4816 356/445 |
| 2015/0192677 A1 | 7/2015 | Yu et al. | |
| 2015/0355333 A1* | 12/2015 | Ono | G01S 17/936 356/4.01 |
| 2016/0223663 A1* | 8/2016 | Schmalenberg | G01S 13/865 |
| 2016/0272126 A1* | 9/2016 | Fisher | B60R 11/04 |
| 2016/0291134 A1* | 10/2016 | Droz | G01S 7/4802 |
| 2016/0297437 A1* | 10/2016 | Hara | B60R 11/04 |
| 2016/0297482 A1* | 10/2016 | Sakabe | B62D 25/06 |
| 2017/0113665 A1* | 4/2017 | Mudalige | G08G 1/166 |
| 2017/0123294 A1* | 5/2017 | Ashtiani | B60R 11/04 |
| 2017/0132480 A1* | 5/2017 | Han | G06T 3/40 |
| 2017/0144669 A1* | 5/2017 | Spata | B60W 40/06 |
| 2017/0163939 A1* | 6/2017 | Thompson | B60R 11/04 |
| 2017/0217429 A1* | 8/2017 | Shioe | B60R 11/04 701/70 |
| 2017/0249845 A1* | 8/2017 | Lettieri | B60Q 9/008 |
| 2018/0003529 A1* | 1/2018 | Ko | G01D 11/30 |

* cited by examiner

SENSOR HOUSING ASSEMBLY FOR ATTACHMENT TO A MOTOR VEHICLE

FIELD

The invention relates to an exterior trim for a motor vehicle, and in particular, to a decorative exterior trim panel for mounting a sensor to an exterior surface of a motor vehicle.

BACKGROUND

The statements in this section merely provide background information related to the present disclosure and may or may not constitute prior art.

Advanced Driver Assistance Systems (ADAS) such as free-ranging on grid navigation, as well as parking guidance and information systems, aid in the prevention of human error when drivers operate a vehicle. Such technologies have been used to improve navigation of roadways, and to augment the parking abilities of motor vehicle drivers while the drivers are present within the motor vehicle. ADAS systems generally rely on sensor systems disposed on exterior surfaces of the motor vehicle. These sensor systems may include cameras, radar, sonar, and LiDAR. Many of these sensors may be mounted flush within the exterior trim of the motor vehicle. However, certain sensors including LiDAR, must protrude from the exterior trim in order to provide the necessary field of view. Thus, LiDAR sensor systems are often retrofitted to preexisting exterior body panels of the motor vehicle. Because the LiDAR sensor systems are added to the exterior body panels and must protrude, they are aesthetically undesirable and unprotected.

While these systems are useful for their intended purpose, there is a need in the art for improved sensor housing assemblies that utilize original equipment manufacturer mounting points, improve sensor functionality, and decrease the potential that the sensor will be damaged while retaining an aesthetically appealing exterior surface.

SUMMARY

In accordance with one aspect of the present invention, a sensor housing assembly for attachment to a vehicle includes a base portion having a first end, a second end, and an exterior decorative surface. The sensor housing assembly further includes a sensor housing portion adapted to house a Light Detection and Ranging (LiDAR) sensor and having a generally semi-cylindrical shape with a top portion and a bottom portion, the top portion forming a first end of the semi-cylindrical sensor housing portion and the bottom portion forming a second end of the semi-cylindrical sensor housing portion. The sensor housing portion is disposed between the first end and the second end of the base portion and extends outward from the exterior surface of the base portion, and the sensor housing portion has a window disposed between the top portion and the bottom portion.

In another aspect of the present invention the window spans an arc of at least 180 degrees.

In yet another aspect of the present invention the sensor housing assembly further includes a base portion disposed between the first end and the second end of the base portion that extends outward from the exterior decorative surface, and the sensor housing portion is disposed on the base portion.

In yet another aspect of the present invention the sensor housing portion further includes a first lip and a second lip, and the window is disposed between the first lip and the second lip.

In yet another aspect of the present invention the sensor housing portion further includes an aperture disposed in the base portion and aligned with the sensor housing portion.

In yet another aspect of the present invention the base portion is a rocker panel of the vehicle.

In yet another aspect of the present invention the base portion is a front fascia of the vehicle.

In yet another aspect of the present invention the base portion is a rear fascia of the vehicle.

In yet another aspect of the present invention the sensor housing portion is located in longitudinal alignment with a door hinge or a door latch of the vehicle.

In yet another aspect of the present invention the sensor housing portion is angled downward such that a field of view of the LiDAR sensor begins immediately adjacent to the vehicle and extends for at least 100 meters outward from the vehicle.

In yet another aspect of the present invention a rocker panel assembly for attachment to a vehicle includes a rocker panel body extending substantially from a front wheel-well to a rear wheel-well on a side of the vehicle, the rocker panel body having a first end, a second end, an exterior decorative surface, and an aperture. The rocker panel assembly further includes a sensor housing portion adapted to house a Light Detection and Ranging (LiDAR) sensor and having a generally semi-cylindrical shape with a top portion and a bottom portion, the top portion forming a first end of the semi-cylindrical sensor housing portion and the bottom portion forming a second end of the semi-cylindrical sensor housing portion. The sensor housing portion is disposed between the first end and the second end of the rocker panel body over the aperture and extends outward from the exterior surface of the rocker panel body. The sensor housing portion has a window disposed between the top portion and the bottom portion, and the sensor housing is situated in longitudinal alignment with a door hinge of the vehicle.

In yet another aspect of the present invention the first end is situated substantially at a trailing edge of the front wheel-well, and the second end is situated substantially at a leading edge of the rear wheel-well.

In yet another aspect of the present invention the exterior decorative surface has a generally convex shape and the rocker panel assembly further includes an inner surface having a generally concave shape.

In yet another aspect of the present invention the inner surface has at least two transverse ribs positioned therein, the transverse ribs being arranged generally perpendicular to a longitudinal axis of the rocker panel body, and the sensor housing portion is disposed between the ribs.

In yet another aspect of the present invention the top portion and the bottom portion each project outward from the rocker panel body substantially perpendicular to the longitudinal axis of the rocker panel and perpendicular to the at least one transverse rib portion.

In yet another aspect of the present invention a bracket which extends through the aperture of the rocker panel assembly and supports a LiDAR sensor within the sensor housing portion of the rocker panel assembly such that the LiDAR sensor is substantially flush with the semi-cylindrical sensor housing portion.

In yet another aspect of the present invention a sensor housing system for a vehicle includes a first sensor housing assembly disposed on a front fascia of the vehicle. The sensor housing system further includes a second sensor housing assembly disposed on a rear fascia of the vehicle. The sensor housing system further includes a third sensor housing assembly disposed on a left side of the vehicle. The sensor housing system further includes a fourth sensor housing assembly disposed on a right side of the vehicle. Each of the first, the second, the third, and the fourth sensor housing assemblies includes a base portion having a first end, a second end, an exterior decorative surface, an aperture, and a window. The sensor housing system further includes a sensor housing portion adapted to house a Light Detection and Ranging (LiDAR) sensor and having a generally semi-cylindrical shape with a top portion and a bottom portion, the top portion forming a first end of the semi-cylindrical sensor housing portion and the bottom portion forming a second end of the semi-cylindrical sensor housing portion. The sensor housing system further includes the sensor housing portion is disposed between the first end and the second end and over the aperture and extends outward from the exterior surface of the base portion. The sensor housing portion further includes a first lip and a second lip define a window that is disposed between the top portion and the bottom portion. The first and the second sensor housing assemblies are disposed in lateral alignment with a centerline of the vehicle, and the third and the fourth sensor housing assemblies are disposed in longitudinal alignment with a door hinge or a door latch of the vehicle, and a field of view of the respective LiDAR sensors overlaps to provide a full 360° combined sensor field of view around the vehicle.

In yet another aspect of the present invention the sensor housing portions of each of the first, the second, the third and the fourth sensor housing assemblies is located approximately halfway between the first and second ends of the respective base portions.

In yet another aspect of the present invention each of the first, the second, the third, and the fourth sensor housing assemblies further includes a bracket which extends through the aperture of the base portion and supports a LiDAR within the sensor housing portion of the sensor housing assembly such that the LiDAR is substantially flush with the semi-cylindrical sensor housing portion In yet another aspect of the present invention the sensor housing portion is angled downward such that a field of view of the LiDAR sensor begins immediately adjacent to the vehicle and extends for at least 100 meters outward from the vehicle.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

Figure 1:
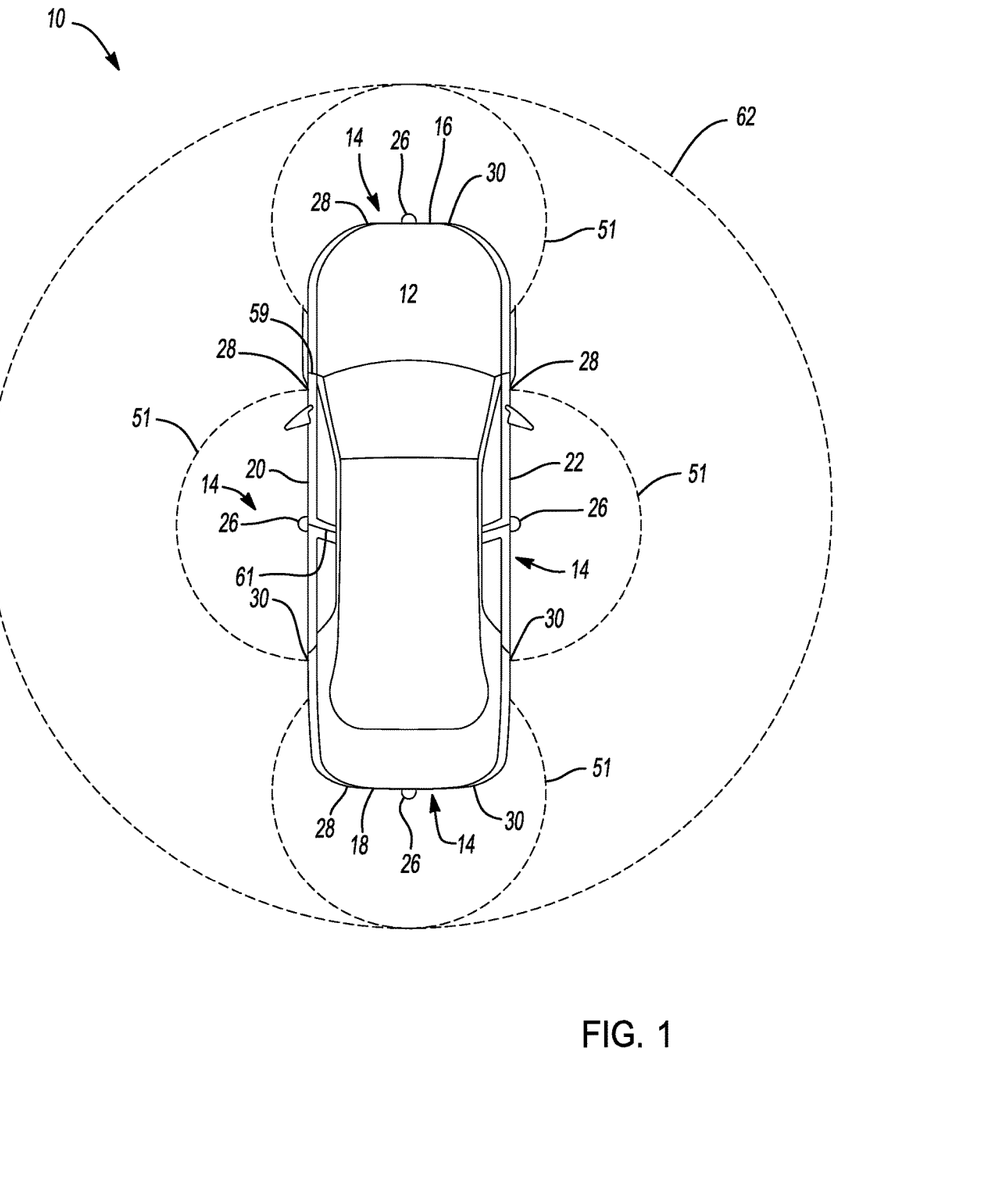
FIG. 1 is a top view of a motor vehicle equipped with a plurality of sensor housing assemblies according to the principles of the present disclosure.

With reference to FIG. 1, a sensor housing system is generally indicated by reference number 10. The sensor housing system 10 is used with an exemplary motor vehicle 12. The motor vehicle 12 is illustrated as a passenger vehicle, however, the motor vehicle 12 may be any type of motor vehicle 12, including a truck, van, motor home, sport utility vehicle, or any other type of vehicle without departing from the scope of the present disclosure. The sensor housing system 10 includes a plurality of sensor housing assemblies 14 mounted around a periphery of the motor vehicle 12. The plurality of sensor housing assemblies 14 may be configured as a front fascia 16, a rear fascia 18, a left side rocker panel 20, and a right side rocker panel 22. The motor vehicle 12 may also include other sensor housing assemblies 14 configured as other motor vehicle body parts, including sideview mirrors, front bumper guards, front grilles, front splitters, rear diffuser panels, lower body-side trim panels, running boards, etc. Furthermore, while in the example of FIG. 1, the motor vehicle 12 is equipped with four sensor housing assemblies 14, it should be understood that the motor vehicle 12 may be equipped with any number of sensor housing assemblies 14 without departing from the scope or intent of this disclosure.

Figure 2:
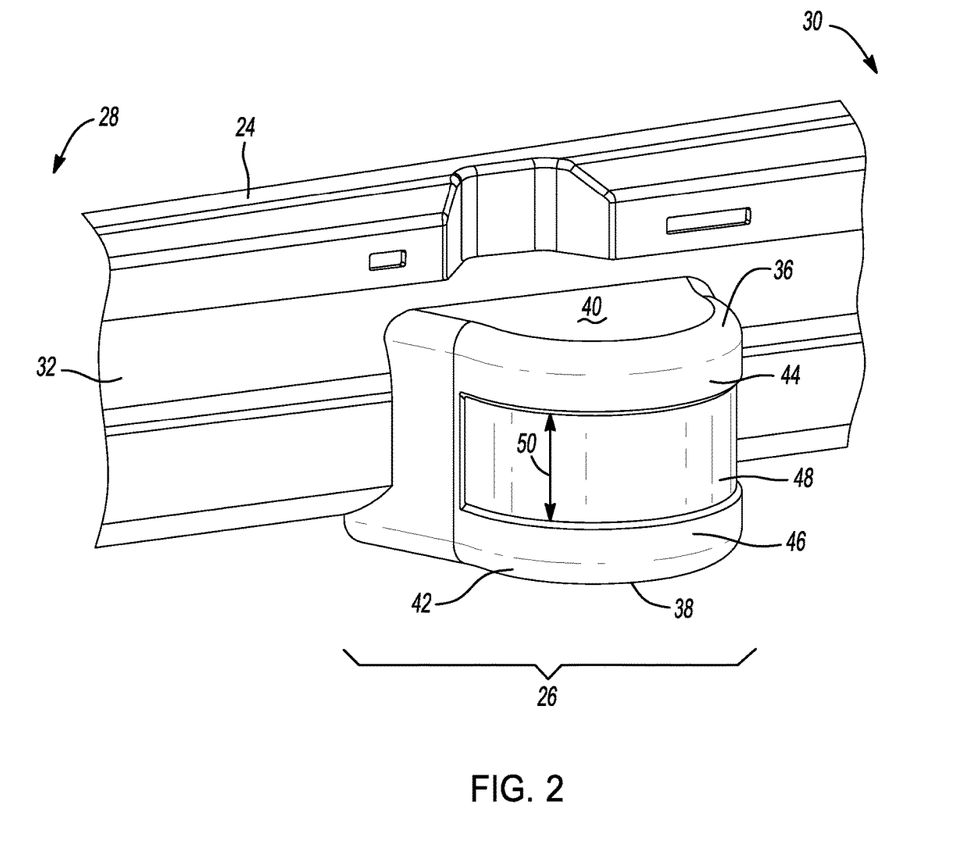
FIG. 2 is a perspective side view of a rocker panel having a sensor housing assembly according to the principles of the present disclosure.
Figure 3:
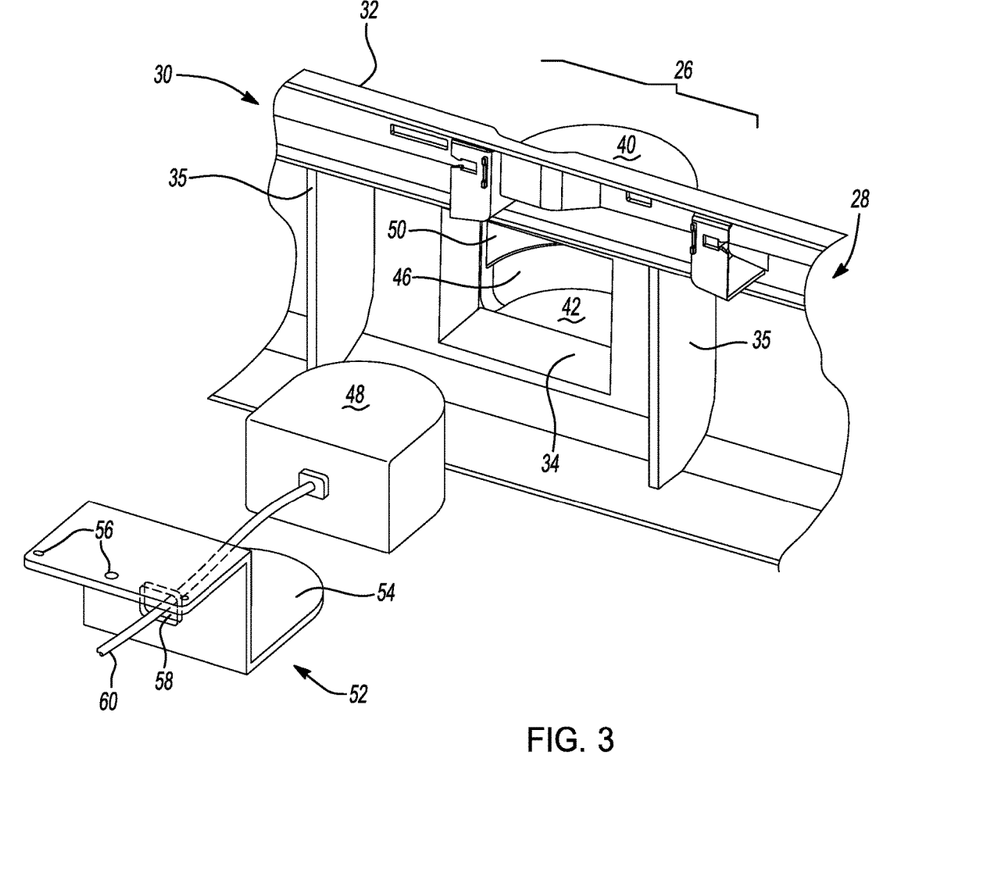
FIG. 3 is a perspective back exploded view of the rocker panel having the sensor housing assembly according to the principles of the present disclosure.

Turning now to FIGS. 2 and 3, and with continuing reference to FIG. 1, by way of example, the sensor housing assembly 14 configured as the right side rocker panel 22 is shown. It should be appreciated that the sensor housing assemblies 14 configured as the front fascia 16, rear fascia 18, and left side rocker panel 20 are substantially similar. The sensor housing assembly 14 includes a base portion 24 from which extends a sensor housing portion 26. The base portion 24 forms an exterior body panel of the motor vehicle 12. In an example of a sensor housing assembly 14 configured as the front fascia 16, the base portion 24 forms a grill within the front fascia 16. The base portion 24 has a first end 28, a second end 30, and an exterior decorative surface 32. In an example in which the sensor housing assembly 14 is on a front fascia 16, the sensor housing assembly 14 first end 28 is a left side of the front fascia 16, and the second end 30 is a right side of the front fascia 16, and the exterior decorative surface 32 of the sensor housing assembly 14 is the exterior surface of the front fascia 16. However, while the sensor housing assembly 14 is described as being on a front fascia 16, it should be appreciated that the sensor housing assembly 14 for a front fascia 16 may also be a portion of the front fascia 16, such as a front grill, a front air-dam, a front splitter, a front bumper cover, front bumper guard, front license plate surround, etc., without departing from the scope or intent of this disclosure. Likewise, in an example of a sensor housing assembly 14 of a rear fascia 18, the first end 28 is a left side of the rear fascia 18, the second end 30 is a right side of the rear fascia 18, and the exterior decorative surface 32 is the exterior surface of the rear fascia 18. While the sensor housing assembly 14 is described as being on a rear fascia 18, it should be appreciated that the sensor housing assembly 14 for a rear fascia 18 may also be a portion of the rear fascia 18, such as a rear bumper cover, rear bumper guard, rear splitter, rear diffuser, rear exhaust trim panel, rear license plate surround, etc., without departing from the scope of this disclosure. In an example of a sensor housing assembly 14 for a left or right side rocker panel 20, 22, the base portion 24 is the respective left or right side rocker panel 20, 22, and the first end 28 of the rocker panel 20, 22 is the front-most end of the rocker panel 20, 22, while the second end 30 of the rocker panel 20, 22 is the rear-most end of the rocker panel. Furthermore, the exterior decorative surface 32 of the sensor housing assembly 14 of the example is a decorative trim on the exterior surface of the left or right rocker panel 20, 22. While the sensor housing assembly 14 for a left or right rocker panel 20, 22 is described as relating to a rocker panel 20, it should be appreciated that the sensor housing assembly 14 for a left or right rocker panel 20, 22 may also be a lower body-side trim panel, running board, mirror, etc., without departing from the scope or intent of this disclosure.

The sensor housing assembly 14 also includes an aperture 34. The aperture 34 is formed through the base portion 24 substantially halfway between the first end 28 and the second end 30, and between two transverse ribs 35. The transverse ribs 35 are arranged generally perpendicular to the longitudinal axis of base portion 24, and provide structural support to the base portion 24, and to the aperture 34. The sensor housing portion 26 is disposed over the aperture 34, and has a generally semi-cylindrical shape with an axis 'x'. The semi-cylindrical shape of the sensor housing portion 26 extends outward from the exterior decorative surface 32 of the base portion 24. The semi-cylindrical shape of the sensor housing portion 26 is defined by a top portion 36, and a bottom portion 38, where the top portion 36 forms a first end 40 of the semi-cylindrical sensor housing portion 26, and the bottom portion 38 forms a second end 42 of the semi-cylindrical sensor housing portion 26. A first lip 44 extends from the top portion 36 towards the bottom portion 38. A second lip 46 extends towards the top portion 36 from the bottom portion 38.

The sensor housing portion 26 is sized and shaped to house a sensor 48. In one aspect, the sensor housing portion 26 is sized to accept a Light Detection and Ranging (LiDAR) sensor 48. The LiDAR sensor 48 is a puck-style sensor having a generally cylindrical or semi-cylindrical shape. While the LiDAR sensor 48 is described as a LiDAR sensor 48, it should be appreciated that the sensor 48 may be any other type of sensor having the ability to detect proximity information. The first lip 44 and the second lip 46 partially enclose and retain the LiDAR sensor 48 within the sensor housing portion 26. Moreover, the first lip 44 and the second lip 46 define a window 50 disposed between the top portion 36 and the bottom portion 38 of the sensor housing portion 26. The window 50 spans an arc of at least 180° about the circumference of the semi-cylindrical sensor housing portion 26. The sensor housing portion 26 extends outward from the base portion 24 so that the window 50 provides the sensor 48 with at least a 180° field of view 51 when mounted to the motor vehicle 12. In one aspect, the sensor housing portion 26 extends outward from the base portion 24 and is also angled out of a horizontal plane such that the field of view 51 of the LiDAR sensor 48 begins immediately adjacent to the motor vehicle 12 and extends for at least one-hundred (100) meters outward from the motor vehicle 12.

With continuing reference to FIGS. 1-4, in one aspect, the sensor housing assembly 14 includes a bracket 52 which extends through the aperture 34 of the base portion 24. The bracket 52 supports the LiDAR sensor 48 within the sensor housing portion 26 of the sensor housing assembly 14 so that the LiDAR sensor 48 is substantially flush with the semi-cylindrical sensor housing portion 26. Moreover, the bracket 52 has a Z-shape and includes sensor mounting features 54, structural attachment features 56, and at least one opening 58 through which an electrical conduit 60 from the LiDAR sensor 48 to a motor vehicle electrical system (not shown) passes. The LiDAR sensor 48 is affixed to the bracket 52 by the sensor mounting feature 54 and fasteners (not shown). The bracket 52 is rigidly attached by way of structural attachment features 56, to a structural component (not shown) of the motor vehicle 12. Both the sensor mounting feature 54, and the structural attachment features 56 may be adhesive materials, mechanical fasteners, or the like without departing from the scope or intent of the present disclosure. In one example, for a sensor housing assembly 14 for a left or right side rocker panel 20, 22, the bracket 52 is mounted by a plurality of bolts or studs (not shown) to a chassis frame-rail, or a similar chassis component. In another example of a sensor housing assembly 14 for the front fascia 16, or rear fascia 18, the bracket 52 is mounted to a front or rear sub-frame component or crash structure by a plurality of bolts or studs (not shown). In one aspect, the opening 58 is formed through the bracket 52. The opening 58 allows the electrical conduit 60 from the LiDAR sensor 48 to interface with electrical systems (not shown) elsewhere in the motor vehicle 12. It should be appreciated that while the bracket 52 is discussed and shown in FIG. 3 as having a Z-shape and being mounted to particular structural components of the motor vehicle 12, the bracket 52 may have an L-shape, a U-shape, an H-shape, a Y-shape, a planar shape, a circular shape, an oblong shape, etc. and the bracket 52 may be mounted to another motor vehicle 12 body or chassis structural component. Furthermore, while the bracket 52 is described as having the opening 58, the bracket 52 may have additional openings 58, or be entirely without openings 58 without departing from the scope or intent of the present disclosure.

Figure 4:
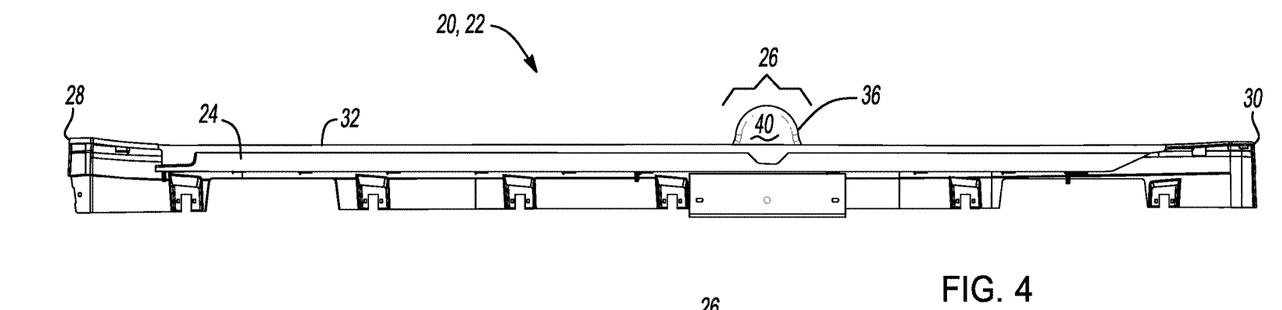
FIG. 4 is a top schematic view of the rocker panel having the sensor housing assembly according to the principles of the present disclosure.
Figure 5:
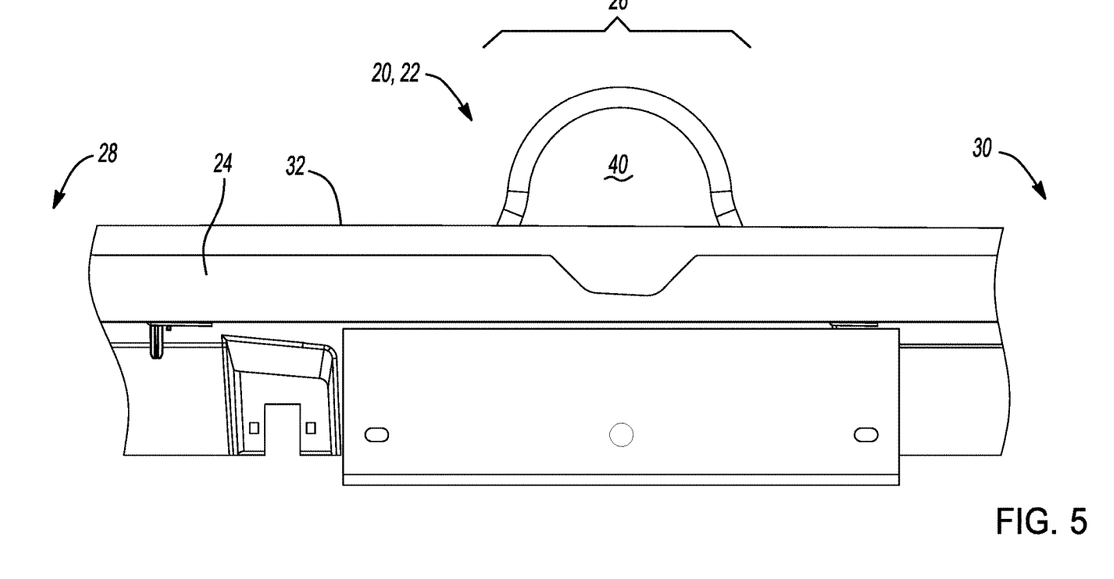
FIG. 5 is a detail of the top schematic view of the rocker panel having the sensor housing assembly according to the principles of the present disclosure.

Turning now to FIGS. 4 and 5, and with continuing reference to FIG. 1, because the sensor housing portion 26 extends outward from the exterior decorative surface 32 of the base portion 24, for some sensor housing assemblies 14, the sensor housing portion 26 may interfere with a motor vehicle operator's ease of ingress/egress. In one example, to mitigate the potential for ingress/egress operator interference from sensor housing assemblies 14 on the left and/or right rocker panels 20, 22, the sensor housing portion 26 is located in a position that is both aesthetically appealing and unlikely to interfere with the motor vehicle operator. For example, the sensor housing portion 26 is located on a body-side trim panel such as a running board or the left or right rocker panel 20, 22 of the motor vehicle 12, and is disposed in longitudinal alignment with a door hinge 59 or a door latch 61 of the motor vehicle 12. The motor vehicle operator's feet and legs are unlikely to contact the sensor housing portion 26 when the sensor housing portion 26 is disposed in alignment with the door hinge 59 or door latch 61 of the motor vehicle 12. Additionally, because locating the sensor housing portions 26 in longitudinal alignment with the door latch 61 or door hinge 59 of the motor vehicle 12 means that the longitudinal position of the LiDAR sensor 48 is close to a mid-point of the motor vehicle 12, aligning the sensor housing portion 26 with the door latch 61 or door hinge 59 also increases the field of view 51 of the LiDAR sensor 48.

In another example, when the sensor housing portion 26 is located on the front fascia 16 or the rear fascia 18 of the motor vehicle 12, the sensor housing portions 26 of each of the sensor housing assemblies 14 are disposed in lateral alignment with a centerline of the motor vehicle 12. Locating the sensor housing portions 26 along the centerline of the motor vehicle 12 provides the LiDAR sensor 48 with the broadest-possible field of view 51 relative to the front or rear of the motor vehicle 12 respectively. In a further example, the fields of view 51 of the respective LiDAR sensors 35 of the front and rear fasciae 16, 18, and of the left and right side rocker panels 20, 22 overlap to provide a full three-hundred and sixty degree (360°) combined sensor field of view 62 around the motor vehicle 12.

By utilizing the sensor housing system 10 in conjunction with a plurality of host vehicle LiDAR sensors 48, an ADAS system, such as an automated valet system, can be used by the motor vehicle 12 operator to provide increased levels of autonomous driving. Using the ADAS system, the operator of the motor vehicle 12 is able to more efficiently, safely, and accurately park and/or un-park the motor vehicle 12. Additionally, because the sensor housing system 10 is integrated substantially into the mid-points of various body panels of the motor vehicle 12, such as the front and rear fasciae 16, 18, and the left and right rocker panels 20, 22, the sensor housing system 10 has an aesthetically pleasing exterior decorative surface 32, and does not interfere with the use and operation of the motor vehicle 12 by the operator. Furthermore, because each of the LiDAR sensors 48 of the sensor housing system 10 is located at a mid-point of the respective sides of the motor vehicle 12, the combined field of view 62 begins substantially adjacent to the motor vehicle 12.

The description of the invention is merely exemplary in nature and variations that do not depart from the gist of the invention are intended to be within the scope of the invention. Such variations are not to be regarded as a departure from the spirit and scope of the invention.

What is claimed is:

1. A sensor housing assembly for attachment to a vehicle, the sensor housing assembly comprising:
    a base portion having a first end, a second end, and an exterior decorative surface; and
    a sensor housing portion adapted to house a Light Detection and Ranging (LiDAR) sensor and having a semi-cylindrical shape with a top portion and a bottom portion, the top portion forming a first end of the semi-cylindrical sensor housing portion and the bottom portion forming a second end of the semi-cylindrical sensor housing portion,
    wherein the sensor housing portion is disposed between the first end and the second end of the base portion and extends outward from the exterior surface of the base portion, and
    wherein the sensor housing portion has a window disposed between the top portion and the bottom portion, and wherein the sensor housing portion is angled downward such that a field of view of the LiDAR sensor begins immediately adjacent to the vehicle and extends for at least 100 meters outward from the vehicle.

2. The sensor housing assembly of claim 1 wherein the window spans an arc of at least 180 degrees.

3. The sensor housing assembly of claim 1 wherein the sensor housing portion includes a first lip and a second lip, and the window is disposed between the first lip and the second lip.

4. The sensor housing assembly of claim 1 further comprising an aperture disposed in the base portion and aligned with the sensor housing portion.

5. The sensor housing assembly of claim 1 wherein the base portion is a rocker panel of the vehicle.

6. The sensor housing assembly of claim 1 wherein the base portion is a front fascia of the vehicle.

7. The sensor housing assembly of claim 1 wherein the base portion is a rear fascia of the vehicle.

8. The sensor housing assembly of claim 1 wherein the sensor housing portion is located in longitudinal alignment with a door hinge or a door latch of the vehicle.

9. A rocker panel assembly for attachment to a vehicle, the rocker panel assembly comprising:
    a rocker panel body extending substantially from a front wheel-well to a rear wheel-well on a side of the vehicle, the rocker panel body having a first end, a second end, an exterior decorative surface, and an aperture;
    a sensor housing portion adapted to house a Light Detection and Ranging (LiDAR) sensor and having a semi-cylindrical shape with a top portion and a bottom portion, the top portion forming a first end of the semi-cylindrical sensor housing portion and the bottom portion forming a second end of the semi-cylindrical sensor housing portion; and
    a bracket which extends through the aperture of the rocker panel assembly and supports a LiDAR sensor within the sensor housing portion of the rocker panel assembly such that the LiDAR sensor is substantially flush with the semi-cylindrical sensor housing portion,
    wherein the sensor housing portion is disposed between the first end and the second end of the rocker panel body over the aperture and extends outward from the exterior surface of the rocker panel body, and
    wherein the sensor housing portion has a window disposed between the top portion and the bottom portion, and
    wherein the sensor housing is situated in longitudinal alignment with a door hinge of the vehicle.

10. The rocker panel assembly of claim 9 wherein the first end is situated substantially at a trailing edge of the front wheel-well, and the second end is situated substantially at a leading edge of the rear wheel-well.

11. The rocker panel assembly of claim 9 wherein the exterior decorative surface has a generally convex shape and wherein the rocker panel assembly further includes an inner surface having a generally concave shape.

12. The rocker panel assembly of claim 11 wherein the inner surface has at least two transverse ribs positioned therein, the transverse ribs being arranged generally perpendicular to a longitudinal axis of the rocker panel body, and wherein the sensor housing portion is disposed between the ribs.

13. The rocker panel assembly of claim 12 wherein the top portion and the bottom portion each project outward from the rocker panel body substantially perpendicular to the longitudinal axis of the rocker panel and perpendicular to at least one of the transverse ribs.

14. The rocker panel assembly of claim 9 further comprising a transition surface interconnecting the base portion and the sensor housing portion, wherein the transition surface has a different contour than the base portion and the sensor housing portion.

15. The rocker panel assembly of claim 9 wherein the first and second ends of the rocker panel body are spaced apart from the sensor housing portion by a distance greater than a width of the sensor housing portion.

16. The rocker panel assembly of claim 9 wherein a center point of the semi-cylindrical housing is positioned at or outboard of the exterior decorative surface.

17. The sensor housing assembly of claim 9 wherein the window spans an arc of at least 180 degrees.

18. The sensor housing assembly of claim 9 wherein the sensor housing portion includes a first lip and a second lip, and the window is disposed between the first lip and the second lip.

19. The sensor housing assembly of claim 9 wherein the aperture is aligned with the sensor housing portion.

20. A rocker panel assembly for attachment to a vehicle, the rocker panel assembly comprising:
   a rocker panel body extending substantially from a front wheel-well to a rear wheel-well on a side of the vehicle, the rocker panel body having a first end, a second end, an exterior decorative surface, and an aperture; and
   a sensor housing portion adapted to house a Light Detection and Ranging (LiDAR) sensor and having a generally semi-cylindrical shape with a top portion and a bottom portion, the top portion forming a first end of the semi-cylindrical sensor housing portion and the bottom portion forming a second end of the semi-cylindrical sensor housing portion, wherein the sensor housing portion is disposed between the first end and the second end of the rocker panel body over the aperture and extends outward from the exterior surface of the rocker panel body, wherein the first end is situated substantially at a trailing edge of the front wheel-well, and the second end is situated substantially at a leading edge of the rear wheel-well, wherein the sensor housing portion has a window disposed between the top portion and the bottom portion, wherein the exterior decorative surface has a generally convex shape and wherein the rocker panel assembly further includes an inner surface having a generally concave shape, and wherein the sensor housing is situated in longitudinal alignment with a door hinge of the vehicle, wherein the inner surface has at least two transverse ribs positioned therein, the transverse ribs being arranged generally perpendicular to a longitudinal axis of the rocker panel body, and wherein the sensor housing portion is disposed between the ribs.

\* \* \* \* \*